(12) United States Patent
Hatabe

(10) Patent No.: US 11,105,488 B2
(45) Date of Patent: Aug. 31, 2021

(54) LIGHTING DEVICE FOR INSPECTION

(71) Applicant: LEIMAC LTD., Moriyama (JP)

(72) Inventor: Shinya Hatabe, Moriyama (JP)

(73) Assignee: LEIMAC LTD., Moriyama (JP)

( * ) Notice: Subject to any disclaimer, the term of this patent is extended or adjusted under 35 U.S.C. 154(b) by 0 days.

(21) Appl. No.: 16/626,080

(22) PCT Filed: Nov. 30, 2018

(86) PCT No.: PCT/JP2018/044235
§ 371 (c)(1),
(2) Date: Dec. 23, 2019

(87) PCT Pub. No.: WO2019/111821
PCT Pub. Date: Jun. 13, 2019

(65) Prior Publication Data
US 2020/0208805 A1 Jul. 2, 2020

(30) Foreign Application Priority Data
Dec. 4, 2017 (JP) ............................. JP2017-232960

(51) Int. Cl.
*F21V 7/00* (2006.01)
(52) U.S. Cl.
CPC ........ *F21V 7/0091* (2013.01); *F21V 2200/20* (2015.01)
(58) Field of Classification Search
CPC .... G01N 2021/8962; G01N 2021/8965; F21V 7/05; F21V 7/0091
See application file for complete search history.

(56) References Cited

U.S. PATENT DOCUMENTS 10,024,790 B2* 7/2018 Ahner ................ G01N 21/4738
10,481,097 B1* 11/2019 Agbuga ............. G01N 21/8806
(Continued)

FOREIGN PATENT DOCUMENTS

CN 205535130 U 8/2016
CN 205664193 U 10/2016
(Continued)

OTHER PUBLICATIONS

International Search Report for International Application No. PCT/JP2018/044235, dated Feb. 19, 2019, 1 pp.
(Continued)

*Primary Examiner* — Matthew J. Peerce
(74) *Attorney, Agent, or Firm* — United IP Counselors, LLC

(57) ABSTRACT

Provided is a lighting device for inspection allowing inspection using lights of a plurality of colors with a simple structure. The lighting device includes: a housing; four light source units disposed inside the housing; a light guide plate that guides light emitted from the light source units and that has four end face portions; and a reflective portion that is formed on an upper face of the light guide plate and that reflects light toward a lower face of the light guide plate. Each of the light source units is disposed for each of the end face portions of the light guide plate and is able to emit light of one color and is independently controlled for dimming, and the four light source units are able to emit lights of collectively two or more colors.

3 Claims, 5 Drawing Sheets

(56) References Cited

U.S. PATENT DOCUMENTS

| | | | |
|---|---|---|---|
| 10,763,645 B2* | 9/2020 | Shang | H01S 5/02284 |
| 2002/0175632 A1 | 11/2002 | Takeguchi | |
| 2005/0041010 A1 | 2/2005 | Komoto et al. | |
| 2005/0117145 A1* | 6/2005 | Altman | G01N 21/87 |
| | | | 356/30 |
| 2007/0097066 A1 | 5/2007 | Ward | |
| 2014/0098370 A1* | 4/2014 | Ahner | G01N 21/95 |
| | | | 356/445 |
| 2016/0260415 A1 | 9/2016 | Hatakeyama | |
| 2020/0187325 A1* | 6/2020 | Petluri | F21K 9/90 |

FOREIGN PATENT DOCUMENTS

| | | |
|---|---|---|
| DE | 102011104214 A1 | 12/2012 |
| JP | 10-319877 A | 12/1998 |
| JP | 11-64639 A | 3/1999 |
| JP | 2003-139712 A | 5/2003 |
| JP | 2013-254711 A | 12/2013 |
| JP | 2016-085171 A | 5/2016 |
| JP | 2016-136124 A | 7/2016 |

OTHER PUBLICATIONS

Extended European Search Report of the corresponding European Application No. 18885909.4, dated Jun. 8, 2021.

* cited by examiner

LIGHTING DEVICE FOR INSPECTION

CROSS-REFERENCE TO RELATED APPLICATIONS

This application is the U.S. National Phase of International Application No. PCT/JP2018/044235, filed Nov. 30, 2018. That application claims priority to JP2017-232960, filed Dec. 4, 2017. Both of those applications are incorporated by reference in their entireties.

TECHNICAL FIELD

The present invention relates to a lighting device for inspection that irradiates light to an article to inspect the article.

BACKGROUND ART

Articles have been conventionally inspected by irradiating light to each article and capturing a reflected light thereof. If the article has a defect, such as a scratch and contamination, the defect can be detected by the difference of the reflected light from other portions. For example, according to the Japanese Patent Application Laid-open No. 2016-136124, a light emitted from an LED is introduced from an end face portion of a light guide plate, and is irradiated to an article disposed below the light guide plate, and the reflected light of the article is captured by a camera disposed above the light guide plate. There is a V-shaped concave portion on an upper face of the light guide plate, so as to reflect light to the article below the light guide plate using the concave portion. A concave portion does not exist in some regions, so that the camera can easily receive the reflected light of the article.

BRIEF SUMMARY

In some cases, however, articles to be inspected and defects thereof may vary, and it may be desirable to use the lights of a plurality of colors for inspection. In the case of inspecting articles using lights of a plurality of colors, it is necessary to prevent the device structure from becoming complicated due to the increase in number of colors.

It is an object of the present invention to provide a lighting device for inspection, allowing inspection using lights of a plurality of colors with a simple structure.

A lighting device for inspection according to the present invention includes: a housing; four light source units disposed inside the housing; a light guide plate that guides light emitted from the light source units and that has four end face portions; and a reflective portion that is formed on an upper face of the light guide plate, and that reflects light toward a lower face of the light guide plate. Each of the light source units is disposed for each of the end face portions and is able to emit light of one color and is independently controlled for dimming, and the four light source units are able to emit lights of collectively two or more colors. Each of the light source units may be independently installed in the housing without being interconnected with the other light source units.

According to the lighting device for inspection of the present invention, four light source units collectively emit lights of a plurality of colors, hence inspection can be made using lights of a plurality of colors. Further, the structure is simple, since each light source unit independently emits light of one color.

DETAILED DESCRIPTION

A lighting device for inspection according to an embodiment of the present invention will be described with reference to the drawings.

Figure 1:
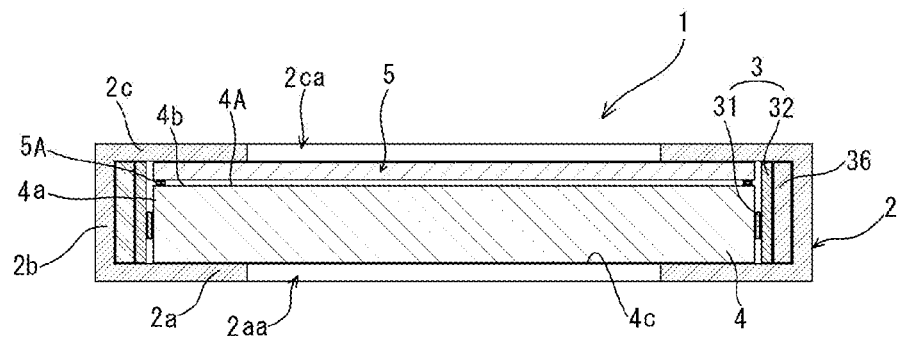
FIG. 1 is a cross-sectional view depicting a structure of the lighting device for inspection of the present application.
Figure 2:
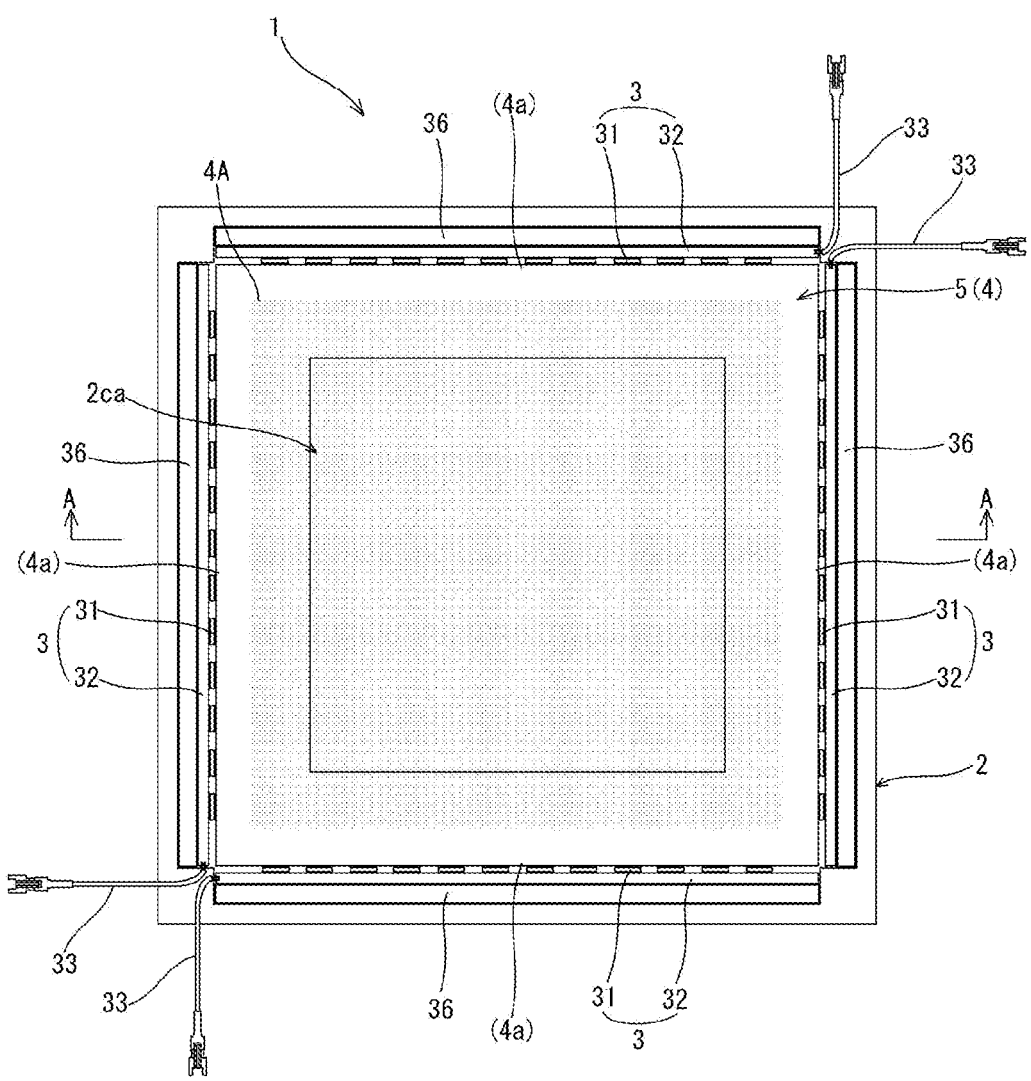
FIG. 2 is a plan view depicting a structure of the lighting device for inspection of the present application.
Figure 3:
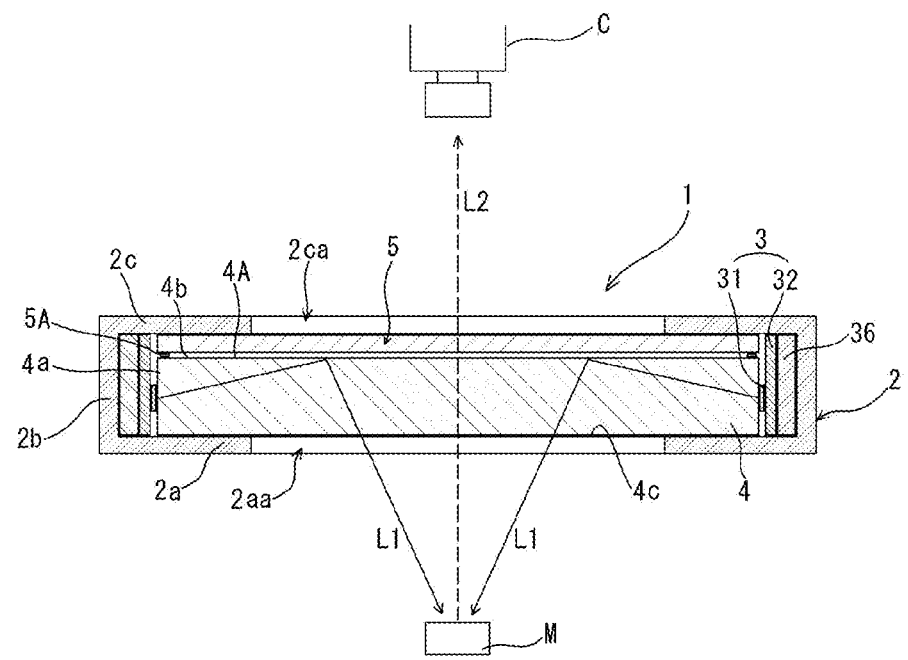
FIG. 3 is an explanatory diagram depicting a state of light in the lighting device for inspection of the present application.

The lighting device 1 for inspection according to an embodiment of the present invention includes: a housing 2, four light source units 3, a light guide plate 4 and a light-transmitting plate 5, as illustrated in FIG. 1 and FIG. 2. As illustrated in FIG. 3, the lighting device 1 for inspection introduces light L1, which is emitted from each light source unit 3, from each end face portion 4a of the light guide plate 4, and irradiates the light L1 to an article M located below the light guide plate 4 by reflecting the light L1 by a later mentioned reflective portion 4A. Reflected light L2 from the article M transmits through the light guide plate 4 (and the light-transmitting plate 5) and enters a camera C, which is disposed above the light guide plate 4. Thereby the article M is imaged and inspected. The article M is placed on a conveyor, a mounting table or the like. FIG. 1 is a cross-sectional view sectioned at the A-A position indicated in FIG. 2. In the drawing in FIG. 2, a later mentioned upper wall 2c of the housing 2 is omitted. Further in FIG. 2, the light guide plate 4 and the light-transmitting plate 5 overlap. In FIG. 2, a later mentioned light-transmitting plate installation member 5A is omitted.

The housing 2 includes and supports the four light source units 3, the light guide plate 4 and the light-transmitting plate 5. The housing 2 is constituted of a lower wall 2a, a peripheral wall 2b which is continuous from the lower wall 2a, and an upper wall 2c which is continuous from the peripheral wall 2b. The peripheral wall 2b has four sides, so that the external shape of the housing 2 is quadrangle (see FIG. 2). Openings 2aa and 2ca are formed in the lower wall 2a and the upper wall 2c respectively, so that light transmits through. The housing 2 is made of a metal material (e.g. aluminum, copper), a resin material or the like. The housing 2 may be divided in upper and lower portions, which are inter-fitted and secured by screws or the like, although an illustration of this is omitted.

Figure 4:
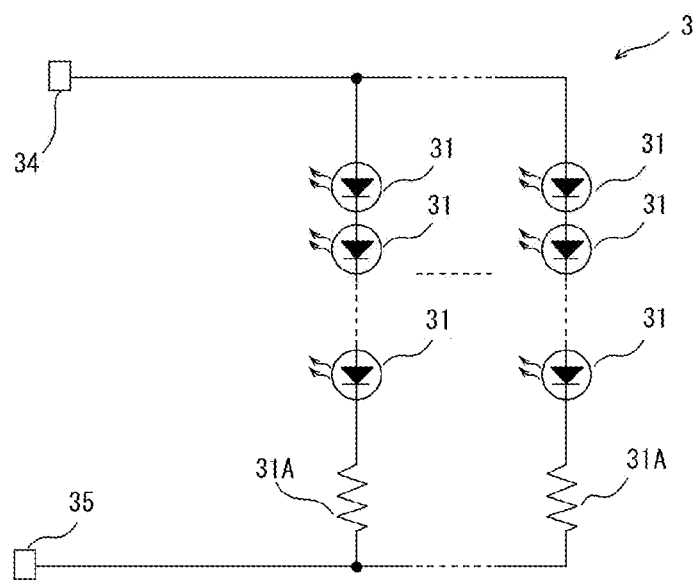
FIG. 4 is a diagram depicting a circuit configuration of one light source unit in the lighting device for inspection of the present application.
Figure 5:
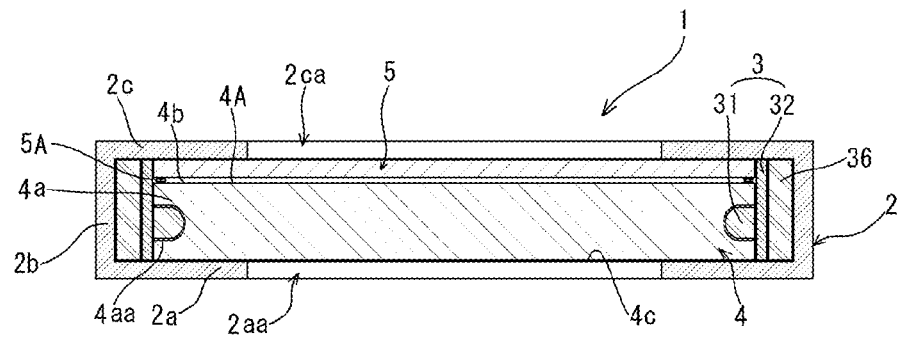
FIG. 5 is a cross-sectional view in the case of using a bullet type light-emitting element in the lighting device for inspection of the present application.
Figure 6:
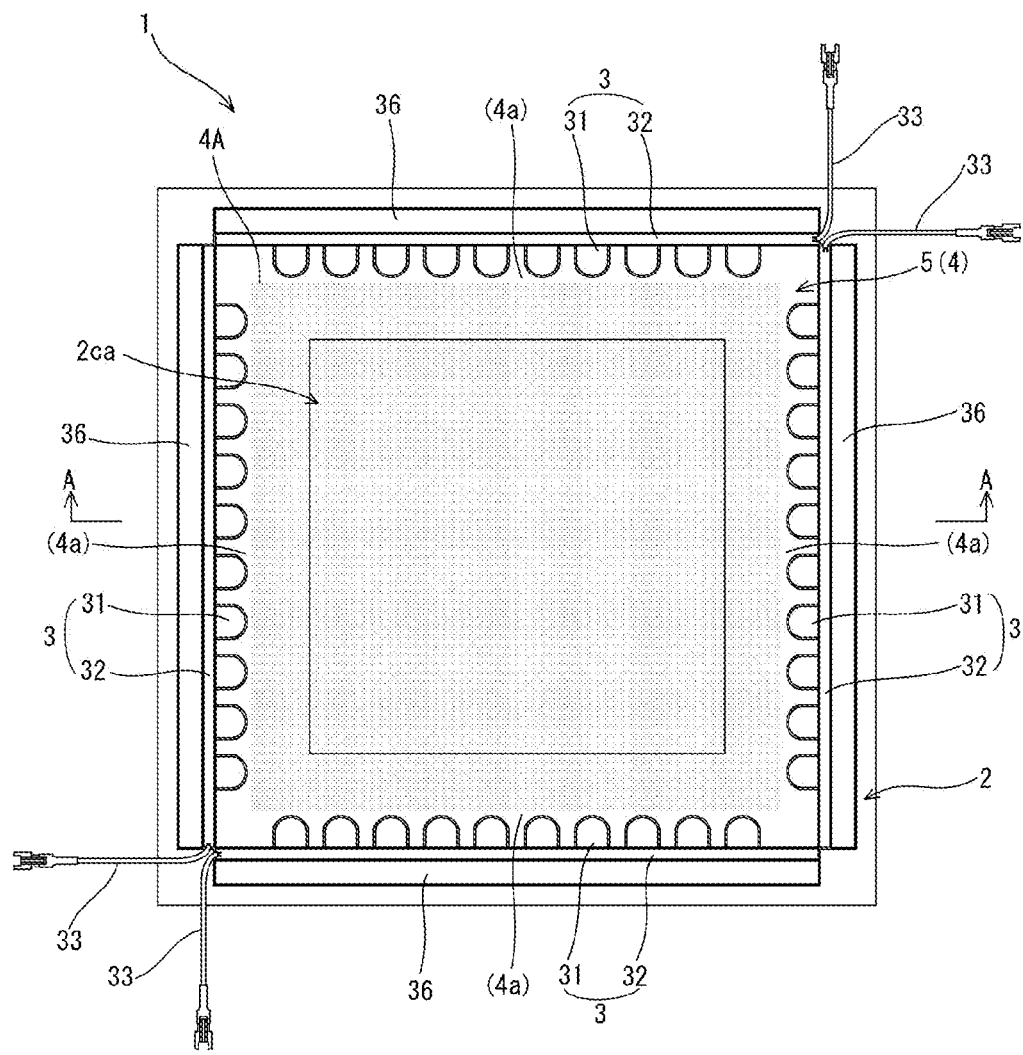
FIG. 6 is a plan view in the case of using a bullet type light-emitting element in the lighting device for inspection of the present application.

As mentioned later, the light guide plate 4 is quadrangle in the plan view (see FIG. 2), and has four end face portions 4a. One light source unit 3 is disposed for each of the end face portions 4a. As illustrated in FIG. 4, each light source unit 3 includes a plurality of light-emitting elements 31. The light-emitting elements 31 are mounted on an elongated printed circuit board 32 (see FIG. 2). Each light-emitting element 31 may be a surface-mount type light-emitting diode (LED), as illustrated in FIG. 1 and FIG. 2, or a bullet type LED, as illustrated in FIG. 5 and FIG. 6. FIG. 5 is a cross-sectional view sectioned at the A-A position indicated in FIG. 6.

A predetermined number of the light-emitting elements 31 and a resistor 31A for limiting current are connected in series in a row, and a predetermined number of rows are connected in parallel. A number of light-emitting elements 31 is not especially limited, but is determined in accordance with the desired specifications.

One wiring cable 33 is disposed for each light source unit 3 (see FIG. 2). A plus terminal 34 and a minus terminal 35 of the light source unit 3 (see FIG. 4) are connected to a dimming power supply apparatus (not illustrated) via the wiring cable 33. In the light source unit 3, current (e.g. PWM current) for dimming control is inputted from the dimming power supply apparatus to the plus terminal 34, and this current flow through the plurality of light-emitting elements 31, and is outputted from the minus terminal 35 to the dimming power supply apparatus. Thereby each of the four light source units 3 is dimmed by independent control.

As described above, each light source unit 3 has a simple structure of only two terminals (plus terminal 34 and minus terminal 35), and is independent from the other light source units 3 without interconnection. If one light source unit 3 fails, only this light source unit 3 need be replaced, that is, maintenance is easy.

The four light source units 3 are installed in the housing 2 independent from one another. The method of installing the light source units 3 in the housing 2 is not especially limited, but it is preferable that a thermal conduction sheet 36, made of silicone resin or the like, is disposed inside the housing 2, and the light source units 3 are installed so as to be pressed toward the light guide plate 4 by the thermal conduction sheet 36. Then not only can the light source units 3 be easily installed, but also the heat generated in the light-emitting elements 31 can be conducted to the housing 2 via the thermal conduction sheet 36 and can be radiated efficiently.

One light source unit 3 emits a light of one color. Therefore in each light source unit 3, the light-emitting element 31 mounted on one printed circuit board 32 emits lights of the same color. Here "light" refers to not only visible light, but also to infrared and ultraviolet lights, and "one color" (same color) refers to colors of which wavelengths are substantially the same. Dimming control is easy since one light source unit 3 emits only one color.

The four light source units 3 can collectively emit lights of two or more colors. An example is that a plurality of light-emitting elements 31 of one color (e.g. white) are mounted on the two light source units 3 facing each other, and a plurality of light-emitting elements 31 of another color (e.g. infrared color) are mounted on the other two light source units 3 facing each other. The dimming power supply apparatus unit performs dimming control for each light source unit 3. Another example is that a plurality of light-emitting elements 31 of one color (e.g. white) are mounted on one light source unit 3, and a plurality of light-emitting elements 31 of another color (e.g. infrared color) are mounted on the other three light source units 3. The dimming control power supply apparatus performs dimming control for each light source unit 3. Another example is that a plurality of light-emitting elements 31 of one color (e.g. red) are mounted on one light source unit 3, a plurality of light-emitting elements 31 of another color (e.g. green) are mounted on another light source unit 3, a plurality of light-emitting elements of another color (e.g. blue) are mounted on another light source unit 3, and a plurality of light-emitting elements 31 of another color (e.g. infrared color) are mounted on the other light source unit 3. The dimming control power supply apparatus performs dimming control for each light source unit 3.

Then one camera C can inspect the article with changing the color of the light. In other words, a defect of an article M which may not be easily detected by a light of one color may be detected by a light of another color. For example, an article M, which is placed and carried on a conveyor or the like, can be inspected using the lights of two or more colors by quickly switching the lights, as mentioned later, or in the case of inspecting a plurality of types of articles M, the articles M can be inspected by switching the lights of colors in accordance with the type of each article M. Further, the light of a desired color can be generated by simultaneously using two or more light source units 3 which emit lights of different colors, and mixing the colors of the lights.

The light guide plate 4 is a plate that is disposed inside the housing 2. For the light guide plate 4, a member that has a predetermined refractive index and excels in light guide properties is used, such as a transparent resin material (e.g. acrylic).

The light guide plate 4 has a quadrangle shape. The size and thickness of the light guide plate 4 are not especially limited, but may have the length of one side about 10 to 20 cm and thickness about 5 mm. In the case where the light-emitting elements 31 are surface mount type LEDs, as illustrated in FIG. 1 and FIG. 2, the end face portions 4a of the light guide plate 4 are flat. In the case where the light-emitting elements 31 are bullet type LEDs, as illustrated in FIG. 5 and FIG. 6, storing holes 4aa, to store the light-emitting elements 31, are formed in the end face portions 4a of the light guide plate 4 at predetermined intervals, but the end face portions 4a of the light guide plate 4 may be flat (without forming the storing holes 4aa), and the light-emitting elements 31 may be disposed in the proximity of or in contact with the end face portions 4a.

Figure 7:
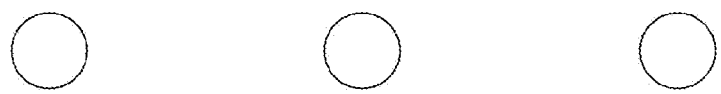
FIG. 7 is a plan view depicting a reflective portion in the lighting device for inspection of the present application.
Figure 7:
Figure 7:
Figure 7:
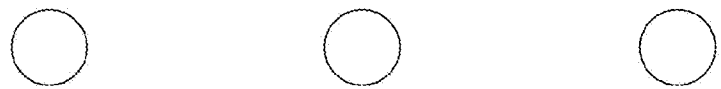
Figure 8:
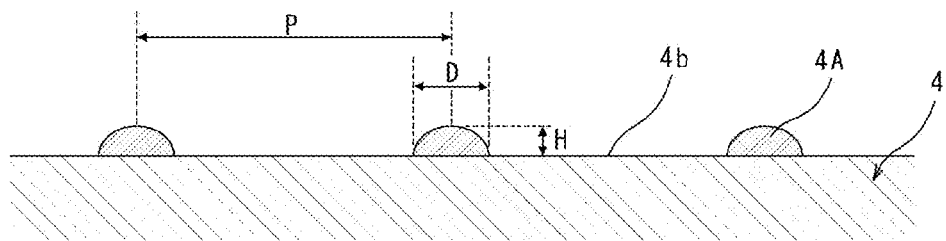
FIG. 8 is a side view depicting a reflective portion in the lighting device for inspection of the present application.

On the upper face 4b of the light guide plate 4, a plurality of reflective portions 4A are arrayed two-dimensionally, as illustrated in FIG. 7 and FIG. 8. Each reflective portion 4A may have a structure that is hemispherical and transparent. "Hemispherical" here refers to a shape of which height gradually decreases from the center of the surface (center in the plan view) to the edge, as illustrated in FIG. 8, and includes a semi-ellipsoid-shaped. "Transparent" here refers to no color (e.g. white) being added. The hemispherical reflective portion 4A can be formed by inkjet printing using ultraviolet curable ink. The ultraviolet curing ink may be an acrylic resin type transparent ink, for example.

The size of the hemispherical reflective portion 4A is not especially limited, but diameter D may be about 20 to 100 µm and height H may be about 10 to 40 µm. The interval (pitch) P of the hemispherical reflective portions 4A is determined depending on the size of the reflective portions 4A and other factors, but may be about 100 to 300 µm, for example. The size of the hemispherical reflective portion 4A and the intervals P of the reflective portions 4A may be changed depending on the location.

The reflective portion 4A is not limited to a hemispherical shape. If the light is well reflected, the reflective portions 4A may have various shaped protrusions or concave portions (or grooves) as disclosed in Patent Document 1.

Figure 9:
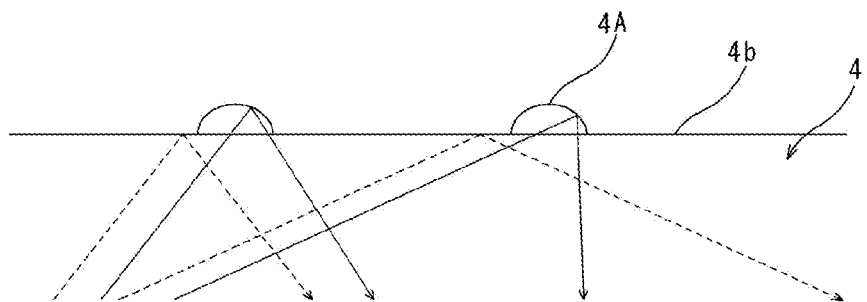
FIG. 9 is an explanatory diagram depicting a state of the lights that are reflected by the upper face of the light guide plate and the reflective portion in the lighting device for inspection of the present application.

The light L1 of each light-emitting element 31 enters into the light guide plate 4 from the end face portion 4a of the light guide plate 4. The light guide plate 4 can reflect the entered light toward the article M disposed below the lower face 4c using the plurality of reflective portions 4A, so as to irradiate the light to the article M. In concrete terms, when the lights introduced from each light source unit 3 are about to exit the light guide plate 4, part of the lights transmit through and the remainder of the lights are reflected by the light guide plate 4 if the incident angle, with respect to the interface (upper face 4b and lower face 4c of the light guide plate 4), is smaller than a critical angle (e.g. 35° to 40°), and all lights are reflected if the incident angle is larger than the critical angle, as indicated by the broken line with an arrow in FIG. 9, because of the difference of the refractive indexes between the light guide plate 4 and air. Each light of which incident angle is larger than the critical angle repeats being reflected, and reaches a wide range, including the center portion of the light guide plate 4. In the case where the reflective portion 4A is hemispherical, for example, when the lights that entered the reflective portion 4A are about to exit the reflective portion 4A, part of the lights transmit through, and the remainder of the lights are reflected by the reflective portion 4A if the incident angle, with respect to the interface (surface of hemispherical reflective portion 4A), is smaller than a critical angle (e.g. 35° to 40°), and all lights are reflected if the incident angle is larger than the critical angle, as indicated by the solid line with an arrow in FIG. 9, because of the difference of the refractive indexes between the reflective portion 4A and air. The lights which are reflected by the reflective portion 4A toward the lower face 4c of the light guide plate 4 are emitted from the lower face 4c of the light guide plate 4. Since the surface of the reflective portion 4A is a curved surface, the lights are directed to the article M from various directions. The reflected lights L2 from the article M enter the light guide plate 4 from the lower face 4c, and transmit through the upper face 4b or the reflective portion 4A, and most of the lights emit upward.

The light-transmitting plate 5 is disposed above the plurality of reflective portions 4A with a gap. For the light-transmitting plate 5, a member that transmits light well is used, such as a transparent resin material (e.g. acrylic). The light-transmitting plate 5 is installed directly to the light guide plate 4, or to the housing 2 or the light source units 3 in some cases, so as to be secured inside the housing 2. This installation is performed with a light-transmitting plate installation member 5A, and a member having a thickness to generate the above mentioned gap (e.g. double-sided tape) is used for this installation member 5A. Since this light-transmitting plate 5 is disposed to create a gap from the plurality of reflective portions 4A, air exists in this gap, which protects the interface between the plurality of reflective portions 4A (and the light guide plate 4) and the air, and ensures the characteristics of the lighting device.

If the interface between the plurality of reflective portions 4A and air can be protected and the characteristics of the lighting device can be ensured, the light-transmitting plate 5 may be omitted, or may be replaced with another member.

The camera C includes a light receiving element, such as a CCD and an CMOS, and converts a captured image into digital data. The digital data is image-processed by a computer, and used to detect defects.

As described above, the lighting device 1 for inspection of the present application can irradiate lights of a plurality of colors to articles M, then inspect the articles M by the lights of a plurality of colors using one camera, hence various inspections can be performed while keeping cost low. Further, each light source unit 3 independently emits light of one color, hence the structure is simple, wiring is simple as well, and maintenance of each light source unit 3 can be independently performed.

The lighting device for inspection according to an embodiment of the present invention has been described, but the present invention can be implemented by an expert skilled in the art by improving, modifying or changing in various ways within a scope of not departing from the essence thereof.

EXPLANATIONS OF REFERENCE NUMERALS

1 Lighting device for inspection
2 Housing
2a Lower wall
2b Peripheral wall
2c Upper wall
2aa, 2ca Opening
3 Light source unit
31 Light-emitting element
31A Resistor
32 Printed circuit board
33 Wiring cable
34 Plus terminal
35 Minus terminal
36 Thermal conduction sheet
4 Light guide plate
4a End face portion
4aa Storing hole
4b Upper face
4c Lower face
4A Reflective portion
5 Light-transmitting plate
5A Light-transmitting plate installation member
C Camera
M Article

The invention claimed is:

1. A lighting device for inspection, comprising:
   a housing;
   four light source units disposed inside the housing;
   a light guide plate that guides light emitted from the light source units and that has four end face portions; and
   a reflective portion that is formed on an upper face of the light guide plate and that reflects light toward a lower face of the light guide plate,
   wherein one wiring cable is provided for each of the four light source units, and each of the light source units is disposed for each of the end face portions, is able to emit light to each of the end face portions, and is independently controlled through the wiring cable for dimming, and
   the four light source units configured such that (1) each of the four light source units emits a single color of light different from colors of light emitted by others of the four light source units, (2) the four light source units can collectively emit a color of light either by switching between ones of the four light source units or by additive color mixing of the different colors, and (3) two or more different colors of light are used sequentially during a single inspection of an inspected article.

2. A lighting device for inspection, comprising:
a housing;
four light source units disposed inside the housing;
a light guide plate that guides light emitted from the light source units and that has four end face portions; and
a reflective portion that is formed on an upper face of the light guide plate and that reflects light toward a lower face of the light guide plate,
wherein one wiring cable is provided for each of the four light source units, and each of the light source units is disposed for each of the end face portions, is able to emit light to each of the end face portions, and is independently controlled through the wiring cable for dimming, and
the four light source units configured such that (1) each of the four light source units emits a single color of light, (2) at least two of the four light source units emit a first color of light; (3) the four light source units can collectively emit a color of light either by switching between ones of the four light source units or by additive color mixing of the different colors, and (4) two or more different colors of light are used sequentially during a single inspection of an inspected article.

3. The lighting device of claim 2, wherein three of the four light source units emit the first color of light and a fourth of the four light source units emits a second color of light, different from the first color of light.

\* \* \* \* \*